UNITED STATES PATENT OFFICE.

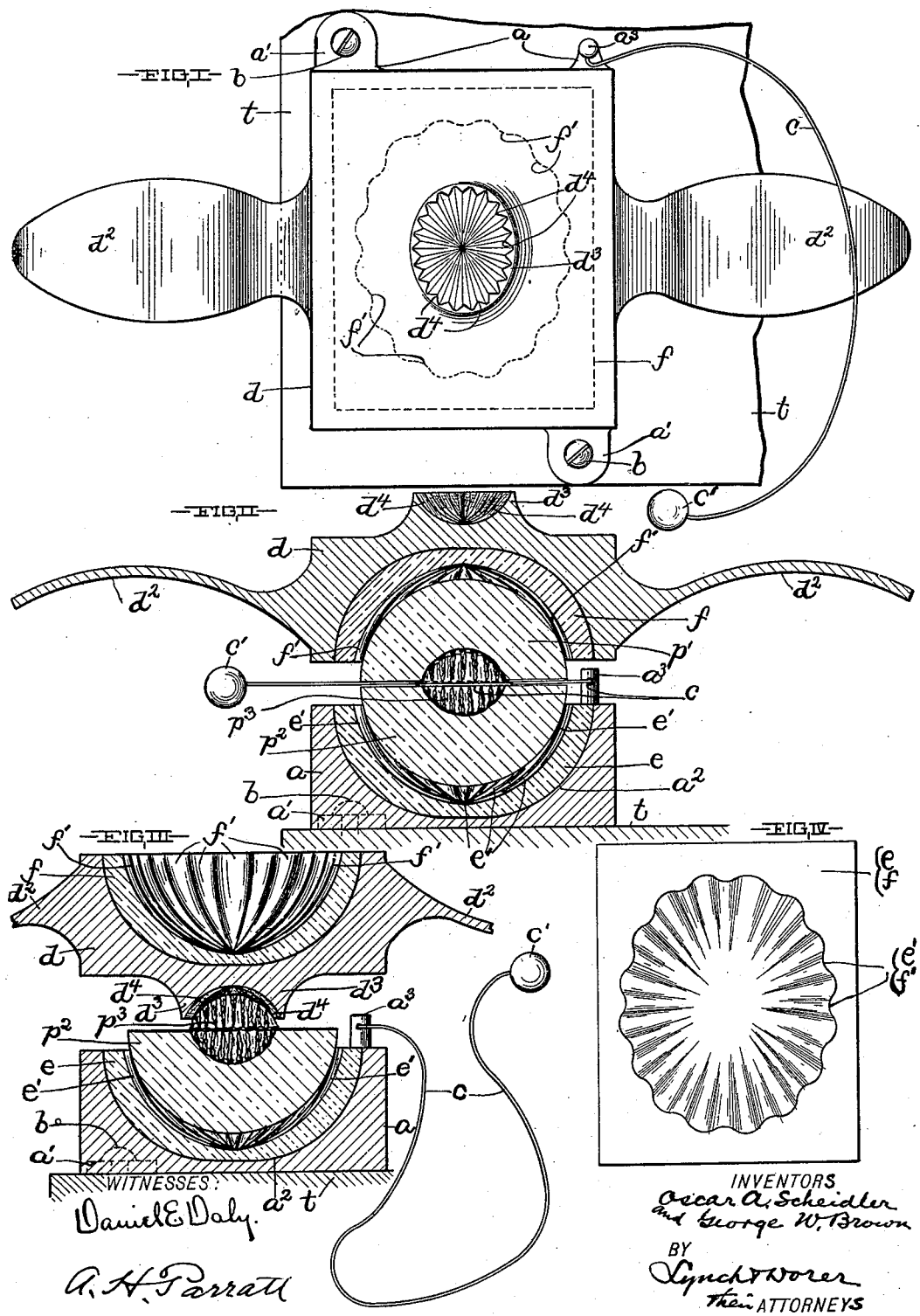

OSCAR A. SCHEIDLER AND GEORGE W. BROWN, OF NEWARK, OHIO.

APPARATUS FOR SPLITTING AND STONING FRUIT.

SPECIFICATION forming part of Letters Patent No. 666,701, dated January 29, 1901.

Application filed October 29, 1900. Serial No. 34,695. (No model.)

*To all whom it may concern:*

Be it known that we, OSCAR A. SCHEIDLER and GEORGE W. BROWN, residents of Newark, Licking county, and State of Ohio, have invented certain new and useful Improvements in Apparatus for Splitting and Stoning Fruit; and we hereby declare the following to be a full, clear, and exact description of the invention, such as will enable others skilled in the art to which it pertains to make and use the same.

Our invention relates to apparatus for splitting and stoning peaches and similarly-formed fruit and that is especially serviceable and valuable in operating upon a clingstone-peach.

The object of this invention is more especially to facilitate the halving of the meat of a clingstone-peach and the separation of the stone therefrom without breaking or bruising the peach, but leaving the peach-meat in two perfect halves.

With this object in view and to the end of rendering the apparatus convenient the invention consists in certain features of construction and combinations of parts hereinafter described, and pointed out in the claims.

In the accompanying drawings, Figure I is a top plan of apparatus embodying our invention. Fig. II is a side elevation, in central section, of the apparatus and shows a peach being operated upon. Fig. III is a side elevation, in central section, of the apparatus and shows the manner after removing one half of the meat of the peach from the stone of loosening the stone from the other half. Fig. IV shows one of the fruit-embracing jaws detached.

Referring to the drawings, $a$ represents the base or stationary part of the apparatus. The base $a$ is provided with any suitable number of external ears or lugs $a'$ for the reception of screws $b$, instrumental in removably securing the said base to a table or other stationary object $t$. The base $a$ is hollowed or chambered centrally, as at $a^2$, from the upper surface of the base downwardly, and the saucer-shaped lower peach-engageable jaw $e$ of the apparatus snugly fits within and conforms externally to the walls of the said chamber.

The jaw $e$ is rendered stationary within the base $a$ by the suitably-formed mutually-engaging opposing surfaces of the said parts or by cement or in any other approved manner, so as to prevent turning or slipping of the said jaw within the base.

The jaw $e$ has such an internal configuration as will render it capable of embracing the lower portion of the peach that is to be operated upon, and the fruit-embracing surface of the said jaw is preferably provided with ribs $e'$, that are arranged at short intervals around the jaw and extend from the upper end of the jaw downwardly and inwardly, so that the said ribs converge toward the center of the bottom of the jaw-forming saucer. The ribbed internal surface of the jaw $e$ is capable of more effectually grasping a peach than a plain surface, and the ribs are preferably rounded to prevent injury to the fruit. The jaw-forming saucer is preferably composed of elastic or somewhat-yielding material—such, for instance, as cork or rubber, preferably rubber—so that the liability of bruising or injuring the fruit engaged thereby during the operation of the apparatus is reduced to a minimum.

The peach or fruit that is to be operated upon having been seated within the lower jaw $e$, as shown in Fig. II, has its meat severed or split horizontally centrally of the stone of the peach by means of a fine severing wire or line $c$, that is fastened at one end in any approved manner to a stud or post $a^3$, formed upon the top of the base $a$ outside of the jaw-receiving chamber of the said base, and the said wire or line is provided at its other or free end with a knob or handle $c'$ for operating the same. The severing-line is operated by taking hold of the knob or handle of the same and coiling the line in a horizontal plane around and centrally of the peach, as shown in Fig. II, and through the flesh or meat of the peach to the stone within the fruit, so that the peach upon the completion of the operation of the severing-line has its meat halved horizontally. The severing-line is composed, preferably, of a fine metallic wire that should, of course, be long enough to render it capable of extending from its fixed end to and completely around the peach. The meat of the peach having been halved, as just hereinbefore described, has the upper half $p'$ then operated upon to loosen it from the stone, so as to leave the stone $p^3$ clinging or adhering only to the lower half $p^2$ of the meat of the peach. The loosening of the upper half of the peach-meat from the stone is effected by horizontally turning or oscillating a jaw $f$, that is placed upon and has the contour required to render it capable of embracing the upper portion of the peach. The upper peach-embracing jaw $f$ is preferably formed, like the lower jaw $e$, already described, of rubber or other elastic or somewhat-yielding material that will not bruise or injure the fruit during the operation of the apparatus and is fitted snugly within and cemented or otherwise secured to a frame $d$, that is preferably metallic and provided with two handles $d^2$ and $d^2$, projecting laterally and outwardly from opposite sides, respectively, of the frame and facilitating the turning or oscillation of the jaw-containing frame upon the upper portion of the peach or fruit that is to be operated upon. The upper jaw, like the lower jaw, has its internal surface ribbed, and its ribs $f'$ are arranged at short intervals around the said jaw and extend from the outer end of the jaw inwardly, so that the ribs converge toward the center of the jaw. The upper half $p'$ of the peach-meat having been loosened from the stone $p^3$, the jaw-bearing frame $d$ is removed from the peach, whereupon the said loosened half of the peach-meat is also removed, and the next and final operation is the loosening of the stone from the lower or remaining half of the peach-meat.

Preferably the jaw-bearing frame $d$ is provided with means for effecting the loosening of the stone $p^3$ from the remaining or lower half $p^2$ of the peach-meat, and this means consists, preferably, of a serrated jaw $d^3$, formed upon the top of the frame $d$ and having the dimensions required to render it capable of embracing and biting the stone $p^3$ upon turning the said frame down side up, as shown in Fig. III. The jaw $d^3$ is formed, therefore, by a cavity made in the top of the frame $d$, and the surrounding wall of this cavity has teeth $d^4$, that are formed at short intervals around the cavity and converge from the outer end of the cavity inwardly toward the center of the inner end of the cavity. The frame $d$ when the jaw $d^3$ has been brought into an operative position upon the peach-stone, as shown in Fig. III, is again oscillated or turned horizontally, and during this operation the said jaw, that has effectually seized the stone, loosens or separates the stone from the lower or remaining half of the peach-meat.

It will be observed that the apparatus hereinbefore described is instrumental in dispensing with tedious and difficult labor. The apparatus halves the meat of the peach and separates the stone from the meat without mashing, bruising, or wasting the fruit. The apparatus is easily and quickly operated. A child can readily operate the same as well as an adult. The extent of handling of the fruit is materially lessened, and the work of preparing the highly-prized clingstone-peach for canning, preserving, and spicing is no longer difficult or objectionable.

What we claim is—

1. Apparatus of the character indicated, comprising a base having a jaw for receiving and holding the lower portion of the peach or fruit, a severing-line adapted to be coiled around and enter and thereby halve or split the meat of the fruit, and a turnable jaw adapted to be mounted upon the upper portion of the fruit, substantially as and for the purpose set forth.

2. Apparatus of the character indicated comprising a severing-wire for halving the meat of the peach or fruit, a stationary jaw for holding one of the meat-half-forming portions of the fruit during the severing operation, and another jaw for engaging the other meat-half-forming portion of the fruit and loosening or separating it from the stone within the fruit by turning the jaw.

3. Apparatus of the character indicated comprising a base having a jaw for receiving and holding the lower portion of the peach or fruit, a severing-wire adapted to be coiled around and enter and thereby halve or split the meat of the fruit, a horizontally-turnable frame provided with a jaw for grasping the upper portion of the fruit and having another jaw for grasping the stone of the fruit upon the removal of the upper portion of the meat from the stone, substantially as and for the purpose set forth.

4. Apparatus of the character indicated comprising a base having a ribbed jaw for receiving and holding the lower portion of the peach or fruit, a severing-wire adapted to be coiled around and enter and thereby halve or split the meat of the fruit above the said jaw, and a horizontally-turnable frame provided with a ribbed jaw for engaging the upper portion of the meat and having another and serrated jaw for engaging the stone of the fruit upon the removal of the said upper portion of the meat, substantially as and for the purpose set forth.

5. Apparatus of the character indicated comprising a severing-line for halving the meat of the peach or fruit, a stationary elastic or yielding jaw for holding one of the meat-half-forming portions of the fruit during the severing operation, and another elastic or yielding jaw for engaging the other meat-half-forming portion of the fruit and loosening or separating it from the stone within the fruit by turning the jaw.

6. Apparatus of the character indicated comprising a stationary base $a$, a jaw seated or fixed within the base for receiving and holding the lower portion of the peach or fruit, the severing-wire attached to the base above the jaw, and the horizontally-turnable frame, a jaw fixed within the said frame and adapted to engage the upper half of the meat of the fruit, and the serrated stone-embraceable jaw formed upon the said frame, all arranged and operating substantially as shown, for the purpose specified.

Signed by me, the said OSCAR A. SCHEIDLER, at Chicago, Illinois, the 16th day of October, 1900.

OSCAR A. SCHEIDLER.

Witnesses to the signature of Oscar A. Scheidler:
H. E. ALMES,
DAVID PALFREYMAN.

Signed by me, the said GEORGE W. BROWN, at Newark, Ohio, the 18th day of October, 1900.

GEORGE W. BROWN.

Witnesses to the signature of George W. Brown:
J. W. HUSSEY,
HOMER RICE.